United States Patent
Takemasa et al.

[11] Patent Number: 5,857,307
[45] Date of Patent: Jan. 12, 1999

[54] HEAT INSULATING STRUCTURE AND PRODUCTION PROCESS THEREOF

[75] Inventors: Kazuo Takemasa, Ota; Takayuki Shimizu, Hanyu; Yasushi Sakata, Tatebayashi; Kazushi Yamaoka; Sadami Hagiguchi, both of Ota, all of Japan

[73] Assignee: Sanyo Electric Co., Ltd., Osaka, Japan

[21] Appl. No.: 492,631

[22] Filed: Jun. 20, 1995

[30] Foreign Application Priority Data

Jun. 29, 1994 [JP] Japan .................................... 6-170303
Jun. 29, 1994 [JP] Japan .................................... 6-170304

[51] Int. Cl.$^6$ ...................................................... E04B 1/78
[52] U.S. Cl. ................... 52/784.15; 52/406.2; 52/406.3; 52/404.4; 52/784.1
[58] Field of Search ................................... 52/171.3, 172, 52/404.1, 795.1, 788.1, 406.2, 406.3, 406.1, 407.2, 404.4, 742.11, 783.19, 792.1, 794.1, 784.15

[56] References Cited

U.S. PATENT DOCUMENTS

| | | | |
|---|---|---|---|
| 1,538,470 | 5/1925 | Copeman | 52/795.1 X |
| 2,768,046 | 10/1956 | Evans . | |
| 3,729,879 | 5/1973 | Franklin | 52/406.2 |
| 5,007,226 | 4/1991 | Nelson | 52/784.15 |
| 5,107,649 | 4/1992 | Benson et al. | 52/406.3 X |
| 5,157,893 | 10/1992 | Benson et al. | 52/406.3 X |
| 5,252,408 | 10/1993 | Bridges et al. | 52/788.1 X |
| 5,376,424 | 12/1994 | Watanabe | 52/406.3 X |

FOREIGN PATENT DOCUMENTS 2064617 7/1981 United Kingdom .................. 52/285.1

Primary Examiner—Carl D. Friedman
Assistant Examiner—Timothy B. Kang
Attorney, Agent, or Firm—Townsend & Banta

[57] ABSTRACT

A heat insulating structure comprising a vacuum insulator fixed to a surface on which the vacuum insulator is to be applied is provided for the purpose of improving the workability in fixing the vacuum insulator to the surface to be applied. A thermally adherable layer comprising a thermally adherable material is made between the vacuum insulator and the surface to be applied, and the thermally adherable layer is heated and melted whereby the vacuum insulator is fixed to the surface to be applied.

6 Claims, 7 Drawing Sheets

HEAT INSULATING STRUCTURE AND PRODUCTION PROCESS THEREOF

BACKGROUND OF THE INVENTION

The present invention relates to a heat insulating structure comprising a vacuum insulator that is fixed to a surface and a production process thereof.

Conventionally, inorganic materials such as glass fiber and organic materials such as expanded polyurethane have been used for hot insulators and cold insulators. Glass fiber has excellent heat resistance, but it has a relative thermal conductivity as high as 0.03 through 0.05 kcal/m.h.° C. and poor thermal insulation performance. Expanded polyurethane has a thermal conductivity of 0.015 kcal/m.h.° C. or so; however, the thermal conductivity is still high in the case of using the material in an insulation box of a freezer that has a temperature inside the box extremely low, for example −90° C. or lower. In such a case the insulation wall would have to be extremely thick to obtain the desired insulation performance.

Thus, recently, vacuum insulators have been used such as disclosed in JP-B 61-17263 (B32B5/18), JP-B 63-35911 (F25D23/06), and JP-B 2-54479 (F16L59/06).

These vacuum insulators are produced by first sealing an insulating material that comprises fine powders of silica or perlite or open cell expanded polyurethane in a bag that has a multilayer laminate structure comprising gas barrier films, and then exhausting the gas (air) inside the bag to create vacuum conditions in the bag. Such vacuum insulators achieve a thermal conductivity as low as 0.005 through 0.010 kcal/m.h.° C. These insulators make it possible to reduce the thickness of the insulation wall of a freezer, which curtails the installation area, and enlarges the volume inside the box, as well as reducing power consumption.

On the other hand, conventional ways of fixing such vacuum insulators to the wall of freezers has been used to make a structure as shown in FIG. 14. In this Figure, reference numeral 1 is the vacuum insulator, mentioned above, that comprises two gas barrier films 2, each of which has laminated internal layers of thermally adherable polyethylene or polypropylene, an aluminum and surface protective layer (as disclosed in JP-B 2-54479), and insulation material 5 inserted between the two gas barrier films 2. The insulation material 5 is made of open cell expanded polyurethane for example, and shown in FIG. 14, by partly removing the gas barrier film 2. The inside of vacuum insulator 1 is evacuated to a predetermined pressure; thereafter, the peripheral part 2A of gas barrier films 2 is heated to make the thermally adherable layers seal together. On the surface of vacuum insulator 1 (the upper outside of the surface protective layer), an adhesive sheet 100 is pasted; or an adhesive material, also shown by reference numeral 100, is precoated on the surface of outer door panel 4 to be insulated (for example, the outer door panel of a freezer), and then vacuum insulator 1 is pasted on the outer door panel 4 sheet by sheet.

In such a conventional process, preliminary pasting of an adhesive sheet to vacuum insulator 1 or to the surface to be insulated, such as outer door panel 4 is carried out; or preliminary coating of an adhesive is effected, then the vacuum insulator is pasted onto the surface to be insulated sheet by sheet. Once fixed, adjustment of the postion of the insulation is very difficult in these structures. Thus, the fixation of the insulation at a predetermined position is difficult and handling is troublesome. When the position of the insulation is incorrect, peeling of the insulation may be necessary, and the adhesive has to be again applied. The fixation of vacuum insulation has been very complicated by these procedures. In addition, there is a risk of breaking the gas barrier film 2 when it is necessary to remove the insulation and repaste the door panel.

SUMMARY OF THE INVENTION

The present invention has been made to overcome such technical problems. An object of the present invention is to improve the process of fixing a vacuum insulator to a surface to be insulated.

A heat insulating structure according to the present invention has a thermally adhered layer comprising a thermally adherable material between a vacuum insulator and a surface to be applied and insulated, the vacuum insulator being fixed to the surface to be applied by heating and melting the thermally adherable material.

A heat insulating structure according to the present invention has, on both a vacuum insulator surface and a surface to be insulated, thermally adherable layers each comprising a thermally adherable material, both thermally adherable layers being adhered closely and thermally melted whereby the vacuum insulator is fixed to the surface to be insulated.

Furthermore, a process for producing a heat insulating structure according to the present invention comprises a step where a thermally adherable layer comprising a thermally adherable material is formed between a vacuum insulator and a surface to be insulated, a step where the thermally adherable layer is heated and melted, a step where the melted thermally adherable layer is cooled and solidified, and a step where the vacuum insulator is fixed to the surface to be applied. Still further, a process for producing a heat insulating structure according to the present invention comprises a step where thermally adherable layers, each comprising a thermally adherable material, are formed on both a vacuum insulator surface and a surface on which the vacuum insulator is to be applied, a step where both of the thermally adherable layers are closely adhered, a step where both of the thermally adherable layers are heated and melted, and a step where both of the melted and thermally adhered layers are cooled and solidified for fixing the vacuum insulator to the surface to be insulated in mutually adhering condition.

According to the present invention, a vacuum insulator is fixed to a surface to be insulated, by melting the thermally adherable layer comprising a thermally adherable material with heat; thus, no adhesion occurs until the heating, thus simplifying the positioning and handling. Thereby, the workability in fixing a vacuum insulator is improved significantly.

Still further, a heat insulating structure according to the present invention has a fixed vacuum insulator on a surface to be insulated by installing a fixing device that retains the peripheral part of the vacuum insulator and setting the fixing device to the surface to be insulated.

According to the present invention, a fixing device retains the peripheral part of the vacuum insulator, thus the fixation to the surface to be insulated is firm, and damage to the vacuum insulator is prevented. Overall workability in the setting operation is improved significantly thereby.

DETAILED DESCRIPTION OF THE PREFERRED EMBODIMENTS

Figure 1:
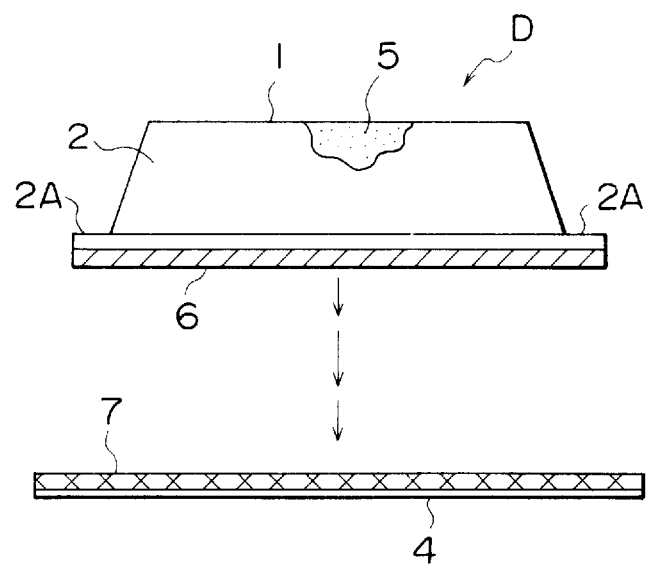
FIG. 1 is a side view partially cut away of a vacuum insulator and an outer door panel which when affixed together comprise a thermal insulation door in one embodiment of the heat insulating structure according to the present invention.
Figure 2:
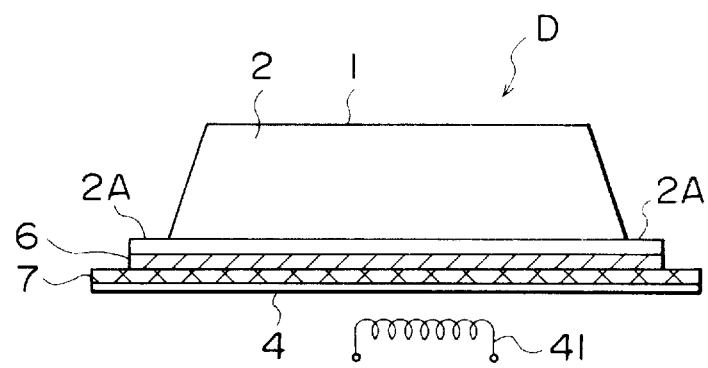
FIG. 2 is a side view showing the vacuum insulator after it is fixed to the outer panel in the above embodiment.
Figure 3:
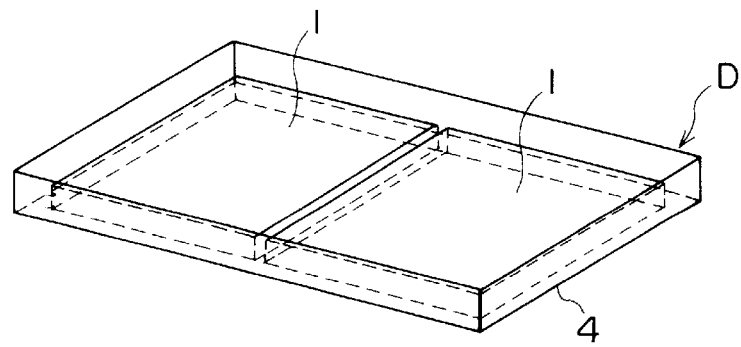
FIG. 3 is a perspective view of the insulation door in the above embodiment.
Figure 14:
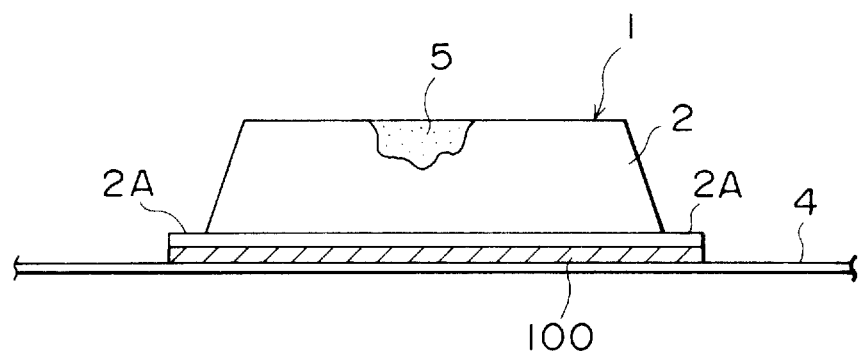
FIG. 14 is a side view partially cut away illustrating a fixing structure of a conventional vacuum insulator.

Now, embodiments of the present invention are explained in details referring to in the drawings herein. The reference numerals shown in FIG. 14 are common in all the drawings. FIG. 1 is a side view of a vacuum insulator 1 and an outer panel 4 composing a thermal insulation door D in an embodiment of the heat insulating structure according to the present invention; FIG. 2 is a side view when the vacuum insulator 1 illustrating the position of when it is fixed to the outer panel 4 in FIG. 5; and FIG. 3 is a perspective view of insulation door D.

The vacuum insulator 1 comprises two gas barrier films 2 each of which has laminated internal thermally adherable layer of polyethylene or polypropylene, aluminum and surface protective layer, and insulation material 5 inserted between the two gas barrier films 2. The insulation material 5 is made of open cell expanded polyurethane, for example, and shown by removing the gas barrier film 2 partly. The inside of vacuum insulator 1 is evacuated to a predetermined pressure. Thereafter, the peripheral part 2A of gas barrier films 2 is heated to make the thermally adherable layers mutually seal together.

One of the gas barrier films 2 (upper side in the drawing) of vacuum insulator 1 is molded in the form of a vessel and the other gas barrier film 2 (lower side in the drawing) is flat. On the surface (lower surface in FIG. 1) of the flat gas barrier film 2, thermally adherable plastic sheets or films 6 such as of polyethylene or polypropylene are laminated thereto.

The outer door panel 4, which is the surface to be insulated, is made of a coated steel sheet or stainless steel, and has a coating layer 7 thereon of thermally adherable plastic, such as polyethylene or polypropylene (upper surface in FIG. 1). When the vacuum insulator 1 is fixed to the outer door panel 4 as indicated by the arrow marks in FIG. 1, the vacuum insulator 1 is superimposed at a predetermined position on the outer door panel 4, and the thermally adherable plastic sheet 6 and the thermally adherable plastic sheet 7 are closely superimposed as shown in FIG. 2. In this step, the thermally adherable plastic sheets 6 and 7 are neither melted nor adhered together; the positioning vacuum insulator 1 in relation to the outer door panel 4 is simplified.

Next, the assembly of vacuum insulator 1 and the outer door panel 4 is heated by a heating device 41 for 5 to 10 minutes, for example, to a temperature ranging from 100° C. to 140° C. During this heating step, the thermally adherable plastic sheets 6 and 7 melt. Subsequent to the heating, the thermally adherable plastic sheets 6 and 7 are cooled and solidified, whereby both sheets 6 and 7 are mutually adhering to one another. With this adhesion, the vacuum insulator 1 is fixed onto the surface of outer door panel 4 as shown in FIG. 3.

The insulation door D as an embodiment of the heat insulating strucutre is, for example, a door of an ultra-deep low temperature freezer not shown in the drawing, and the outer door panel 4 is as a whole in the shape of a rectangular container. Two sheets of the vacuum insulator are set upper and lower in the internal recesses of the rectangular container. After the fixation of vacuum insulator 1, an inner sheet, not shown in the drawing, is installed, and expanded polyurethane not shown in the drawing, for example, is charged into the space, other than the vacuum insulator 1, inside the insulator door D by means of foaming in place to complete the insulation door D.

In the embodiment mentioned above, the gas barrier film 2 of the vacuum insulator 1 is laminated on the surface (lower surface in FIG. 1) with the thermally adherable plastic sheet 6. However, the present invention is not limited to this embodiment, and the thermally adherable plastic layer may be coated on the gas barrier film 2, as is the case of the outer door panel 4, or else the thermally adherable plastic sheet 6 may be adhered to the surface of the gas barrier film 2.

Furthermore, while the whole of vacuum insulator 1 and outer door panel 4 is heated to adhere the whole of the thermally adherable plastic sheets 6 and 7, the method of adhesion is not limited to this procedure, and heating may be carried out on only a part or spots corresponding to the periphery part 2A to cause adhesion.

Figure 4:
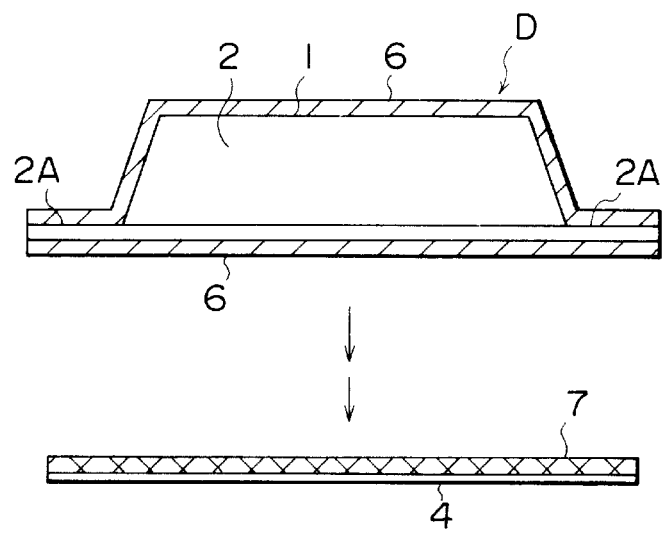
FIG. 4 is a side view showing a vacuum insulator and an outer door panel in another embodiment of the present invention.
Figure 5:
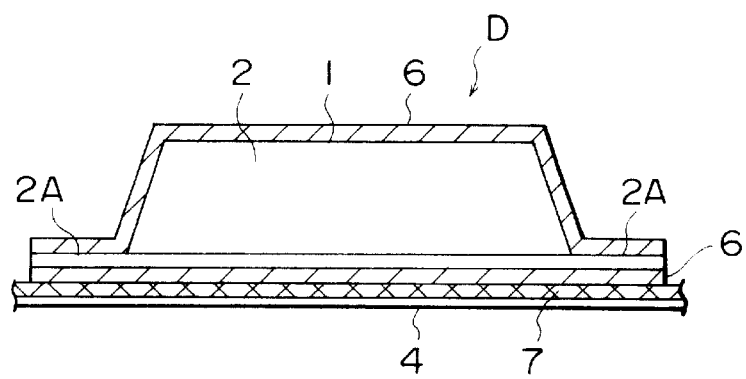
FIG. 5 is a side view showing the vacuum insulator and outer panel in the embodiment shown in FIG. 4 after they are affixed together.

FIGS. 4 and 5 illustrate another embodiment of the present invention. In this embodiment, one surface (upper surface in FIG. 4) of one (upper side of the drawing) of the gas barrier film 2 of the vacuum insulator 1 and the other surface, the lower surface in FIG. 4 of the other (lower side of the drawing) of the gas barrier films 2 are both laminated with the thermally adherable plastic sheet 6.

As is the case in the previous embodiment, the vacuum insulator 1 is thermally adhered to the outer door panel 4; however, in this embodiment, the whole surface of the gas barrier film 2 is laminated with the thermally adherable plastic sheet 6, this being a very convenient structure in case the vacuum insulator 1 is fixed between two panels.

Figure 6:
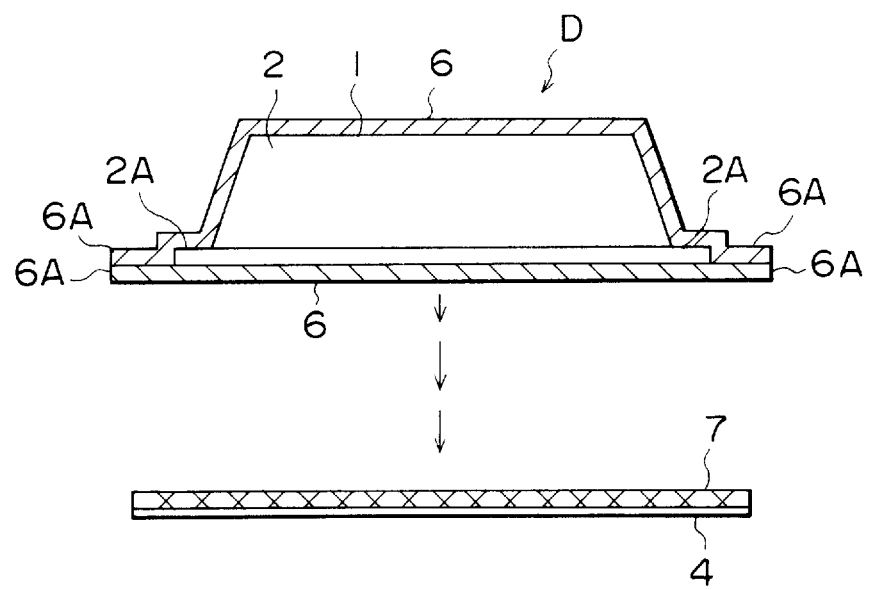
FIG. 6 is a side view of a vacuum insulator and an outer door panel in still another embodiment of the present invention.
Figure 7:
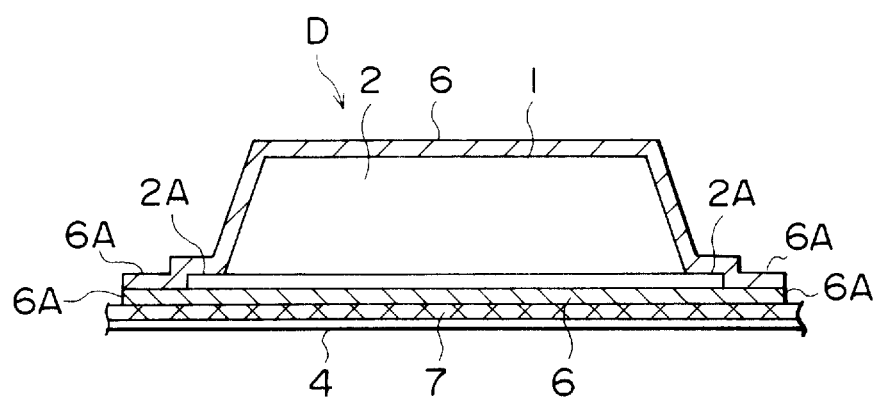
FIG. 7 is a side view showing the vacuum insulator and the outer panel in the embodiment shown in FIG. 6 after they are fixed together.

FIGS. 6 and 7 illustrate still another embodiment of the present invention. In this case, the three sides of the periphery part 6A, 6A of two thermally adherable plastic sheets 6, are preliminarily adhered to form a bag shape, in which bag a vacuum insulator 1 is inserted. Thereafter, a vacuum is created inside the bag, then the remaining side is adhered thermally. In this way, the thermally adhered plastic sheets 6 are provided over the whole surface of the gas barrier film 2. This structure also functions as in the previous embodiment.

Here, such vacuum insulators are subjected to vacuum internally, and the surface might not be smoothly flat but become slightly concave and/or convex. FIGS. 8 through 13 illustrate heat insulating structures that are suitable for such cases.

Figure 8:
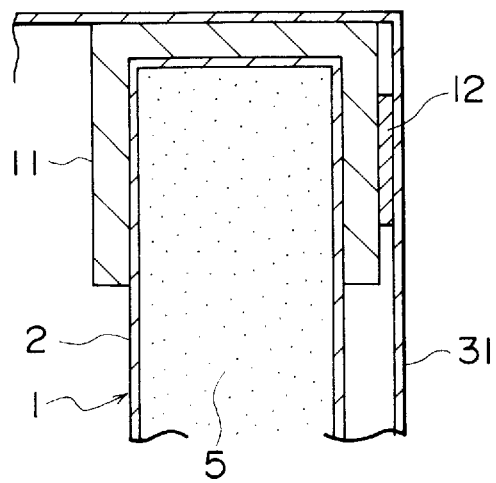
FIG. 8 is an enlarged partial cross-sectional view of an outer side wall panel in still another embodiment of the heat insulating structure according to the present invention.
Figure 9:
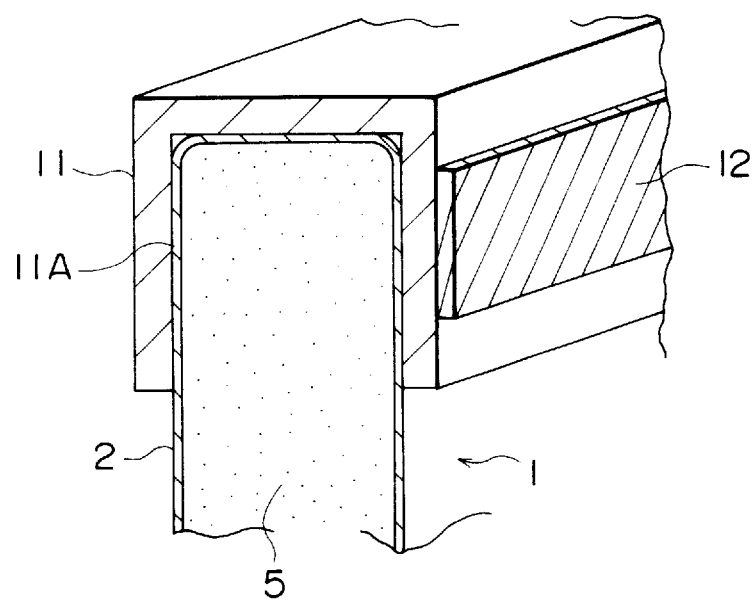
FIG. 9 is a perspective partial view of the vacuum insulator and fixing device composing the heat insulating structure shown in FIG. 8.

The reference numerals in FIGS. 1 through 7 and FIG. 14 are common respectively for designating the same parts. FIG. 8 is an enlarged cross-sectional view of the corner part of an outer side wall panel 31 in a side wall 27, which is an embodiment of the heat insulating structure in the mentioned case. FIG. 9 is a perspective view of the vacuum insulator 1 and the fixing device 11.

The vacuum insulator 1, as in previous cases, comprises two gas barrier films 2, each of which has laminated internal thermally adherable layer of polyethylene or polypropylene, aluminum and surface protective layer, and insulation material 5 inserted between the two gas barrier films 2. The insulation material 5 is made of open cell expanded polyurethane, for example, and shown by partly removing the gas barrier film 2. The inside of vacuum insulator 1 is evacuated to a predetermined pressure. Thereafter, the peripheral part of the gas barrier film 2 is heated to make the thermally adherable layers mutually seal together.

A fixing device 11 is set on the peripheral part of vacuum insulator 1 as shown in FIG. 9. The fixing device 11 which is made of a plastic by extrusion molding into a U-shape, has a flat and smooth surface. The dimension of a retaining part 11A that is incorporated in the fixing device 11, has an open end, and approximately fits the shape and thickness of the vacuum insulator 1. Thereby, the retaining part 11A of fixing device 11 encompasses and holds the edge part of vacuum insulator 1 so that the gas barrier films 2 are not broken. In addition, on one surface (front surface, for example) of fixing device 11, an adhesive tape 12 is applied in the lengthwise direction.

When the vacuum insulator 1 is fixed to the outer side wall panel 31 that is made of a coated steel sheet or stainless steel sheet, the vacuum insulator 1 is positioned in a predetermined location of the inner surface of outer side wall panel 31 and fixed with the adhesive tape 12 of fixing device 11 applied to the inner surface of outer side wall panel 31, FIGS. 8 and 9.

In this procedure, close adherence to the outer side wall panel 31 is sufficiently secured since the surface of fixing device is flat and smooth. Thus, the vacuum insulator 1 is firmly fixed to the outer side wall panel 31 with substantially improved workability. The outer side wall panel 31 having the fixed vacuum insulator 1 is coupled with the inner side wall panel that is not shown in the drawing; the space between both panels other than the vacuum insulator 1 being filled with expanded polyurethane by foaming in place. As a result, a side wall 27, FIG. 12, described later herein, is completed as a heat insulating structure.

Figure 10:
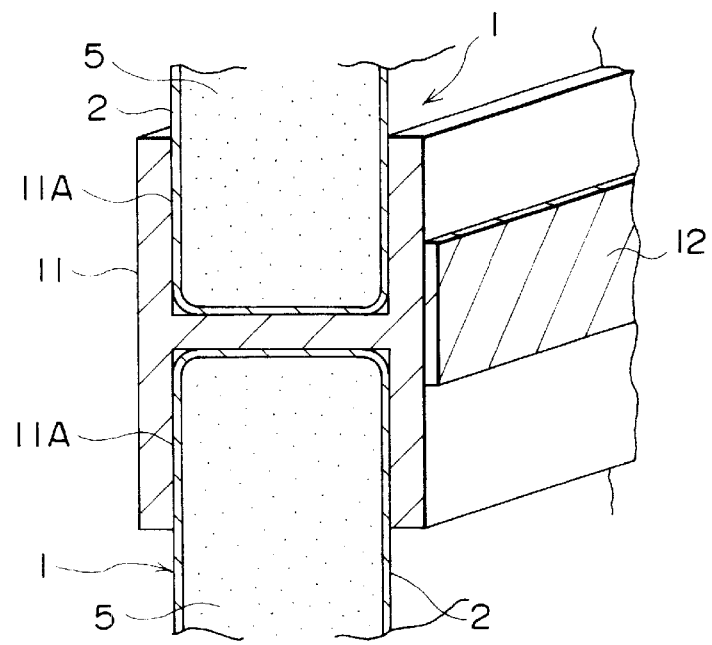
FIG. 10 is a perspective partial view of a vacuum insulator and a fixing device in another embodiment of the fixing device.

Here, the fixing device 11 is not limited to having a U-shaped cross-section as shown in FIG. 8 and may have an approximate H-shape as shown in FIG. 10. In this case, the fixing device 11 is also formed by extrusion molding of a plastic, and the fixing device has a flat and smooth surface. The fixing device 11 has a pair of retaining parts 11A, which has opposed open ends. The retaining parts 11A retain and hold edge parts of the two sheets of vacuum insulator 1, 1 respectively.

On one surface (front surface, for example) of fixing device 11 as well, an adhesive tape 12 is applied in the lengthwise direction. Thus, with the fixing device 11 in this case, the two sheets of vacuum insulator 1, are connected on the same plane and can be fixed simultaneously on the flat surface to be insulated, such as the outer side wall panel 31, by using the adhesive tape 12 pasted on the surface to be insulated.

Figure 11:
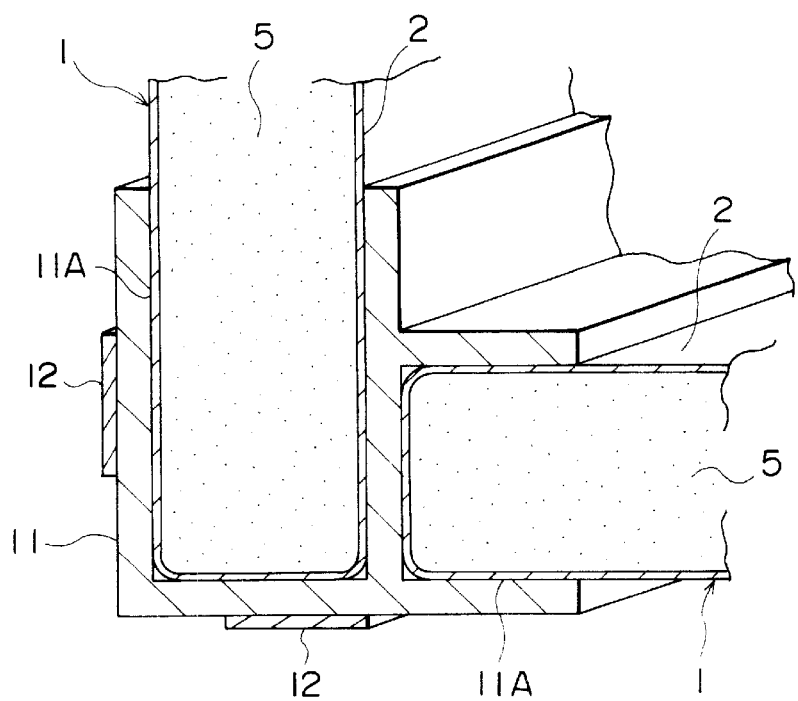
FIG. 11 is a perspective partial view of a vacuum insulator and a fixing device in still another embodiment of the fixing device.

FIG. 11 illustrates the cross-section of the fixing device 11 in which case the retainers 11A, are integrally formed, and wherein retainers have open ends nearly perpendicularly to each other. Also in this case, the fixing device 11 is formed by extrusion molding of a plastic which has a flat and smooth surface. On two surfaces (back and lower surfaces for example), adhesive tapes 12 are applied in the lengthwise direction.

With such fixing device 11, retaining parts 11A retain two sheets of vacuum insulators 1, 1, respectively; the two sheets of vacuum insulators 1, 1 can be simultaneously fixed to the surfaces, perpendicularly crossed, to be insulated.

Figure 12:
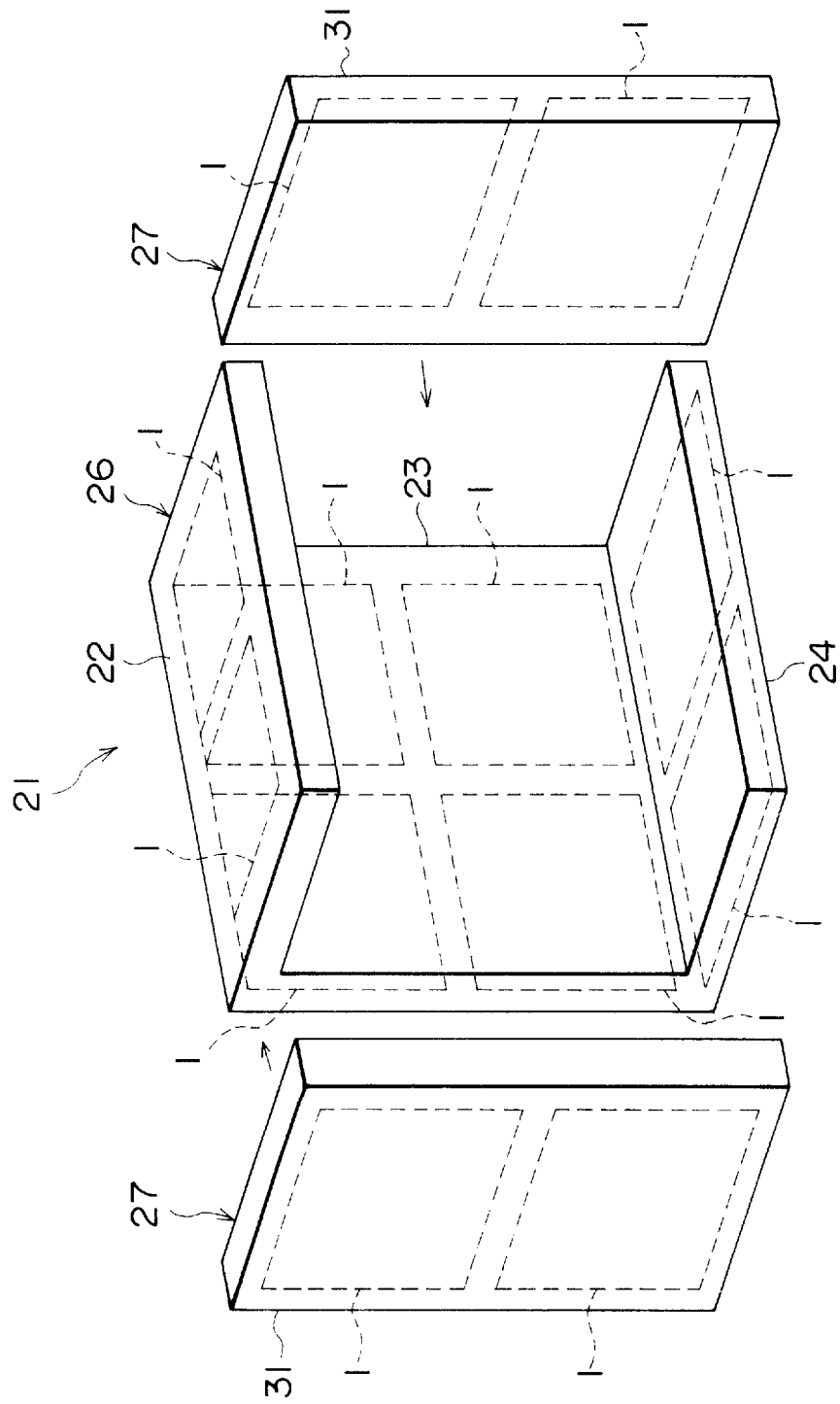
FIG. 12 is an exploded perspective view of an insulation box applying the invention shown in FIG. 8.

FIG. 12 is an exploded perspective view of an insulation box 21 comprising such vacuum insulator 1. The insulation box 21 constitutes the main body of an ultra-deep low temperature freezer, for example, and comprises the main insulating wall 26 including a ceiling wall 22, back wall 23 and bottom wall 24, and the two side walls 27, 27 fixed to both sides of the main insulating wall 26. In the side wall 27, the two sheets of vacuum insulator 1, 1 are connected and fitted on the same plane by the fixing device 11. In the connecting parts of the ceiling wall 22 to the back wall 23 and of the back wall 23 to the bottom wall 24, respectively, the two sheets of vacuum insulator 1, 1 are connected and fixed nearly perpendicular by the fixing device 11 shown in FIG. 11.

Figure 13:
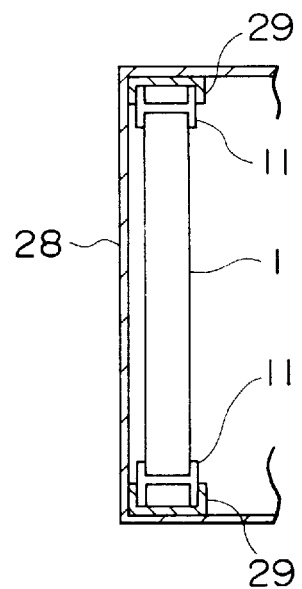
FIG. 13 is a cross-sectional partial view of an outer box illustrating fixing configuration of the vacuum insulator comprising the heat insulating structure illustrated in FIG. 12.

FIG. 13 illustrates another embodiment of the structure for fixing a vacuum insulator 1. In this drawing, the reference numerals are common with FIGS. 8 through 12, respectively, for designating the same parts. In this embodiment, a fixing device 11 in a shape of frame having nearly H-shape cross-section is fixed on the edge of the vacuum insulator 1, thus retaining the vacuum insulator 1. On the other hand, a pair of rails 29, 29 is preliminarily installed on the upper and lower internal surfaces of the outer box 28 of the main insulating wall 26. The fixing device 11 of vacuum insulator 1 is inserted like a sliding door and fixed between the rails 29, 29, thus retaining the vacuum insulator 1.

In this structure, the vacuum insulator 1 can be fitted without using an adhesive tape, as is the case mentioned above. The fitting work of the vacuum insulator 1 becomes much smoother.

While the vacuum insulator having open cell expanded polyurethane that is internally sealed is used in the above embodiments, the vacuum insulator is not limited to this type and may use silica or perlite powder for general purposes. In the embodiments mentioned above, the vacuum insulator is fixed to the outer door panel or the body of insulation box of an ultra-deep low temperature freezer. However, the present invention is not limited to such embodiments and is useful for application to any other surfaces.

As explained in detail hereinabove, according to the present invention, a vacuum insulator is fixed to a surface to be insulated, by melting the thermally adherable layer comprising a thermally adherable material with heat; thus, no adhesion is made until the heating, and the positioning and handling become very easy. Thus, the workability in fixing a vacuum insulator is improved significantly.

Furthermore, according to the present invention, a fixing device retains and holds the peripheral part of the vacuum insulator, thus the fixation to the surface to be insulated is firm and potential damage to the vacuum insulator is prevented. As a result, overall workability in the setting is improved significantly thereby.

What is claimed is:

1. A heat insulating structure having an outer wall with an internal surface, said insulating structure further comprising a vacuum insulator and a fixing device having an adhesive strip thereon, said vacuum insulator comprising polyurethane insulation material inside thermally sealed gas barrier films of polyethylene or polypropylene;

said fixing device being separate and distinct from said outer wall of said heat insulating structure before said fixing device is fixedly secured to the internal surface of said outer wall of said heat insulating structure by said adhesive strip, said fixing device being rigid and having side walls forming a cavity into which peripheral parts of said vacuum insulator are retained.

2. The heat insulating structure of claim 1, wherein said fixing device has a U-shaped cross-section.

3. The heat insulating structure of claim 1, wherein the fixing device has an H-shaped cross-section for retaining two vacuum insulators.

4. The heat insulating structure of claim 1, wherein the fixing device has a plurality of cavities for retaining a plurality of vacuum insulators.

5. The heat insulating structure of claim 4, wherein two or more of said cavities in the fixing device are at right angles to one another.

6. The heat insulating structure of claim 1, wherein a vacuum insulator having fixing devices secured to opposite edges thereof is held in sliding engagement by a pair of rails which are secured to the inner surface of the outer wall of said heat insulating structure.

* * * * *